US012020139B2

(12) United States Patent
Friedman et al.

(10) Patent No.: US 12,020,139 B2
(45) Date of Patent: Jun. 25, 2024

(54) PROBABILISTIC MODELING FOR ANONYMIZED DATA INTEGRATION AND BAYESIAN SURVEY MEASUREMENT OF SPARSE AND WEAKLY-LABELED DATASETS

(71) Applicant: The Nielsen Company (US), LLC, New York, NY (US)

(72) Inventors: Joshua Ivan Friedman, New York, NY (US); Tara Zeynep Baris, New York, NY (US); Neel Parekh, New York, NY (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 18/103,253

(22) Filed: Jan. 30, 2023

(65) Prior Publication Data

US 2023/0177317 A1    Jun. 8, 2023

Related U.S. Application Data

(63) Continuation of application No. 16/886,379, filed on May 28, 2020, now Pat. No. 11,568,215.
(Continued)

(51) Int. Cl.
*G06N 3/04* (2023.01)
*G06N 3/045* (2023.01)
(Continued)

(52) U.S. Cl.
CPC ............ *G06N 3/047* (2023.01); *G06N 3/045* (2023.01); *G06N 3/08* (2013.01); *G06Q 30/0201* (2013.01);
(Continued)

(58) Field of Classification Search
CPC .......... G06N 3/047; G06N 3/045; G06N 3/08; G06Q 30/0201; G06Q 30/0254; H04N 21/4663; H04N 21/4666
See application file for complete search history.

(56) References Cited

U.S. PATENT DOCUMENTS 6,144,772 A  *  11/2000  Garland .................. G06T 9/007
                                                    382/131
8,165,386 B1     4/2012  Moon et al.
(Continued)

FOREIGN PATENT DOCUMENTS

CN          114127743 A        3/2022
KR        20180014561 A        2/2018
(Continued)

OTHER PUBLICATIONS

Sanchez et al., "ZSim: Fast and Accurate Microarchitectural Simulation of Thousand-Core Systems," ACM SIGARCH Computer Architecture News, Jun. 2013, 12 pages.
(Continued)

*Primary Examiner* — Scott C Anderson

(57) ABSTRACT

An example apparatus includes processor circuitry to: access first input data from meters, the meters to monitor media devices associated with a plurality of panelists, the first input data including media source data and panel data; reduce a dimensionality of the first input data to generate second input data of reduced dimensionality relative to the first input data, the dimensionality of the first input data to be reduced based on a prior probability of an audience rating associated with the plurality of panelists and an approximation of a dependency of the audience rating on at least one of the media source data and the panel data; and decode the second input data of reduced dimensionality to output a probability model parameter for a multivariate probability model, the multivariate probability model having dimen-
(Continued)

sions corresponding to the first input data, the multivariate probability model to label census data.

20 Claims, 4 Drawing Sheets

Related U.S. Application Data

(60) Provisional application No. 62/874,346, filed on Jul. 15, 2019.

(51) Int. Cl.
| | | |
|---|---|---|
| *G06N 3/047* | (2023.01) | |
| *G06N 3/08* | (2023.01) | |
| *G06Q 30/0201* | (2023.01) | |
| *G06Q 30/0251* | (2023.01) | |
| *H04N 21/466* | (2011.01) | |

(52) U.S. Cl.
CPC ..... *G06Q 30/0254* (2013.01); *H04N 21/4663* (2013.01); *H04N 21/4666* (2013.01)

(56) References Cited

U.S. PATENT DOCUMENTS

| | | | |
|---|---|---|---|
| 8,768,770 | B2 | 7/2014 | Kitts et al. |
| 2008/0147497 | A1 | 6/2008 | Tischer |
| 2012/0260278 | A1* | 10/2012 | Lambert ............... H04H 60/66 725/9 |
| 2013/0066730 | A1* | 3/2013 | Myslinski ............ H04L 51/063 707/723 |
| 2016/0150280 | A1 | 5/2016 | Cui et al. |
| 2016/0300252 | A1 | 10/2016 | Frank et al. |
| 2016/0379231 | A1* | 12/2016 | Sheppard ............... G06N 7/01 705/7.33 |
| 2018/0035142 | A1 | 2/2018 | Rao et al. |
| 2018/0165554 | A1 | 6/2018 | Zhang et al. |
| 2018/0253743 | A1 | 9/2018 | Li et al. |
| 2018/0331771 | A1* | 11/2018 | Arh ....................... H04H 20/12 |
| 2019/0012684 | A1 | 1/2019 | Cui et al. |
| 2019/0034766 | A1 | 1/2019 | Chen et al. |
| 2019/0130296 | A1* | 5/2019 | Basu ....................... G06F 17/11 |
| 2019/0294874 | A1 | 9/2019 | Orlov et al. |
| 2020/0027157 | A1* | 1/2020 | Xu .......................... G06N 7/01 |
| 2020/0258171 | A1 | 8/2020 | Gibbon et al. |

FOREIGN PATENT DOCUMENTS

| | | |
|---|---|---|
| WO | 2019118644 A1 | 6/2019 |
| WO | 2021011573 A1 | 1/2021 |

OTHER PUBLICATIONS

Keng, "Sem-supervised Learning with Variational Autoencoders," [bj keng.github.io/posts/semi-supervised-learning-With-variational-autoencoders/],Sep. 11, 2017,10 pages.

Rocca, "Bayesianinference problem, MCMC and variational inference," (https:/ltowardsdatascience.com/bayesian-inference-proble1THT1cmc-and-variational-inference-25a8aa9bce29], Jul. 1, 2019, 19 pages.

Patent Cooperation Treaty, "International Search Report," issued in connection with International Application No. PCT/US2020/041989, dated Oct. 26, 2020, 3 pages.

International Searching Authority, "Internalional Preliminary Report on Palenlability" issued in connection with International Application No. PCT/US2020/041989, dated Jan. 18, 2022,5 pages.

United States Patent and Trademark Office, "Non-Final Office Action," issued in connection with U.S. Appl. No. 16/886,379, dated Jun. 20, 2022, 20 Pages.

United States Patent and Trademark Office, "Notice of Allowance," issued in connection with U.S. Appl. No. 16/886,379, dated Nov. 2, 2022, 10 Pages.

European Patent Office, "Extended European Search Report," issued in connection with European Patent Application No. 20839929.5-1218, dated Jul. 14, 2023, 7 pages.

European Patent Office, "Communication pursuant to Rules 70(2) and 70a(2) EPC," issued in connection with European Patent Application No. 20839929.5-1218, dated Aug. 1, 2023, 1 page.

* cited by examiner

PROBABILISTIC MODELING FOR ANONYMIZED DATA INTEGRATION AND BAYESIAN SURVEY MEASUREMENT OF SPARSE AND WEAKLY-LABELED DATASETS

CROSS-REFERENCE TO RELATED APPLICATIONS

This patent arises from a continuation of U.S. patent application Ser. No. 16/886,379 (now U.S. Pat. No. 11,568, 215), which was filed on May 28, 2020, which claims the benefit of U.S. Provisional Patent Application No. 62/874, 346, which was filed on Jul. 15, 2019. U.S. patent application Ser. No. 16/886,379 and U.S. Provisional Patent Application No. 62/874,346 are hereby incorporated herein by reference in their entireties. Priority to U.S. patent application Ser. No. 16/886,379 and U.S. Provisional Patent Application No. 62/874,346 is here by claimed.

FIELD OF THE DISCLOSURE

This disclosure relates generally to audience measurement and, more particularly, to probabilistic modeling for anonymized data integration and Bayesian survey measurement of sparse and weakly-labeled datasets.

BACKGROUND

An explosion in the amount of programmatic content and number of delivery channels via which it is made available have made it increasingly difficult to accurately measure media exposure using traditional survey panels. Although digital media distributors collect vast amounts of data on media exposure within their own walled gardens, personal privacy protections and proprietary interests may make it difficult to pool these datasets together. Also, data collected by digital media distributors may lack detailed and reliable demographic information that that is used to weight observations derived from such datasets.

BRIEF DESCRIPTION OF THE DRAWINGS

The figures are not to scale. In general, the same reference numbers will be used throughout the drawing(s) and accompanying written description to refer to the same or like parts, elements, etc.

Figure 1:
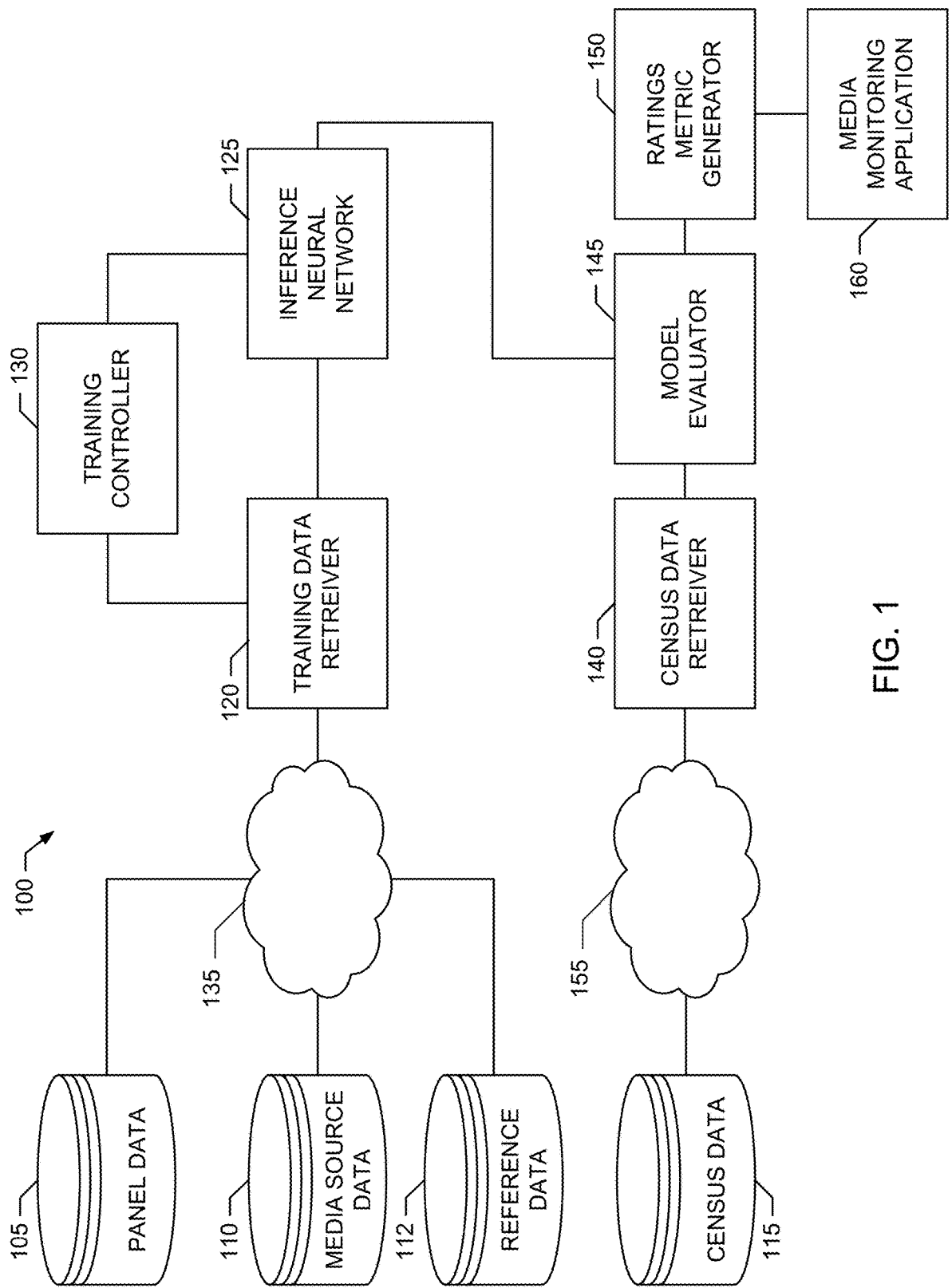
FIG. 1 illustrates a block diagram of an example variational inference audience measurement system 100 implemented in accordance with teachings of this disclosure.

Descriptors "first," "second," "third," etc., are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example methods, apparatus, systems and articles of manufacture (e.g., physical storage media) to implement probabilistic modeling for anonymized data integration and Bayesian survey measurement of sparse and weakly-labeled datasets are disclosed herein. Weighted survey data has been the de facto standard approach for measuring consumer behaviors for well over 100 years. Survey based measurement has traditionally relied upon the extrapolation of panelists behavioral patterns to a total population. Because survey based measurements utilize a small sample of the total population, survey based measurement techniques tend to break down when the desired measurement is highly stratified and the effective sample size decreases. Thus, with media exposure now divided between hundreds of television networks and a countless number of online streaming options, it has become difficult to aggregate sufficient statistics on all programmatic content using finite sized respondent level survey data.

Unlike such prior survey-based approaches, example techniques disclosed herein build a probabilistic model that attempts to project behavioral propensities based upon population strata characteristics, rather than measure individual level behaviors directly. Disclosed example techniques pool mutual information between observations in different substrata that have similar characteristics, thereby improving small area (sparse) estimates. Furthermore, because disclosed example techniques are based on probabilistic models, it is possible to incorporate aggregated (and thus anonymized) third party observational data into measurement models, and to learn from weakly labeled datasets that are missing some of the information that would be available when using respondent level observational data.

Prior efforts in audience measurement have focused on supplementing well controlled survey information with near-census level observational data provided by media distribution providers. However, data privacy restrictions can make it difficult to effectively integrate this additional observational data into measurement products. Disclosed example techniques overcome these limitations by leveraging recent advances in Bayesian Inference (BI) to construct probabilistic models of consumer behavioral patterns that effectively side-step many of the limitations of classical survey sampling methods.

BI techniques as utilized herein provide benefits. For example, BI techniques disclosed can:
 (i) decouple individual respondents from measurement, protecting personally identifiable information (PII);
 (ii) exploit both labeled and unlabeled data to improve measurement accuracy; and.
 (iii) compensate for limited sample size by sharing mutual information across respondents.

Example BI techniques disclosed herein assume respondent level observations (e.g., to view a particular program, visit a website, purchase a product, see a particular advertisement, etc.) are realizations drawn from a random variable describing the likelihood of a given outcome. Disclosed example BI techniques infer the unknown probability distribution that is most consistent with the available observational data. The inferred probability distribution is then evaluated to measure the probability of an outcome.

Bayes' Theorem can provide an equation for finding this probability distribution, but a naive application of Bayes' rule does not effectively leverage mutual information between markets or respondents that might make a more informed inference-based measurement possible. To better exploit the available data whilst reducing the assumptions concerning what is a 'true' measurement, disclosed examples model respondent level data using a probabilistic model based on a variational inference encoder. Such examples presume there exists a probability distribution describing the true value of measurement to be made and the confidence in the measurement given available data.

Consider an instructive example. Suppose a measurement product is to measure the percent of the population that was exposed to a particular advertisement (e.g., referred to as an audience rating for that advertisement). It might be reasonable to represent this measurement as a Beta distribution parameterized by shape parameters $\alpha$ and $\beta$. Thus, the probability of a given audience rating under this formulation would be given by Equation 1:

$$P(\text{rating}) = \text{Beta}(\alpha, \beta) \quad \text{Equation 1}$$

Prior BI techniques may seek to find the parameters of the probability distribution (measurement) that are most consistent with respondent level observations. For the above rating example, this could be accomplished by evaluating the likelihood of different values of $\alpha$, $\beta$ using a Binomial distribution defined for N number of panelists (trials) and x number of unique viewers (successes) according to Equations 2:

$$\text{argmax}_{\alpha, \beta} \text{Binomial}(\text{Beta}(\alpha, \beta), N, x) \quad \text{Equation 2}$$

The optimal values of $\alpha$, $\beta$ given data for a particular program (or advertisement, in this example) could then be learned using Markov Chain Monte Carlo based sampling techniques. However, using such prior BI techniques for learning independent $\alpha$, $\beta$ parameters for all the programmatic content in the universe at each moment in time would be highly inefficient.

Unlike such prior techniques, disclosed examples based on variational inference learn a function referred to as an Encoder Neural Network (ENN $\theta$) that approximates the parameterizations of the underlying probabilistic model, such as the $\alpha$, $\beta$ of unknown Beta distribution in the preceding example, given information about features such as the content, time of day, population of interest, and/or any other information that might be available. Such disclosed example techniques encode any available information by passing it through the ENN $\theta$ network first, which is represented by Equation 3:

$$\alpha, \beta = \text{ENN}_\theta(\text{features}) \quad \text{Equation 3}$$

The goal of example variational inference approach disclosed herein is to learn weights $\theta$ of ENN $\theta$ defining the probability distribution Q(rating) that best approximates the model P(rating) and by extension the posterior measurement of interest. That is, P(rating) estimates the probability of an audience rating (e.g., the measurement of interest). For example, P(rating) estimates the probability of an audience rating of an advertisement, a television show, etc. In examples disclosed herein, Q(rating) is an approximation of P(rating). For example, Q(rating) can be based on an ENN $\theta$ to approximate an audience rating for the advertisement, the television show, etc.

Disclosed example measurement techniques are generalizable to many measurement objectives and not limited to the specific probabilistic ratings model outlined above. Using a probabilistic model to describe population level behavior enables use of fixed probabilities or aggregated priors provided by third party data holders that do not compromise individual level PII. Also, disclosed example measurement techniques could be used to leverage incomplete or unlabeled data in measurement products.

Turning to the figures, a block diagram of an example variational inference audience measurement system 100 implemented in accordance with teachings of this disclosure is illustrated in FIG. 1. The example variational inference audience measurement system 100 includes example databases 105, 110, 112 and 115 maintaining example panel data, example media source data, example third-party data and example census data, respectively. For example, the panel data database 105 may correspond to one or more databases, servers, cloud data centers, etc., storing and managing panelist data obtained by an audience measurement entity (AME) using panel meters located at panelist sites. For example, the panelist data can include monitoring data representative of media content exposed to a panelist. That is, the panelist data can include monitored media signatures and/or monitored media watermarks representative of the media monitored by the panel meters. In some examples, the panelist data is associated with a discrete, measurement time period (e.g., five minutes, ten minutes, etc.). In such example, the panelist data can include at sequences of monitored media signatures and/or sequences of monitored media watermarks associated media asset(s) (or portions thereof) presented by media devices monitored by the panel meters.

The media source data database 110 may correspond to one or more databases, servers, cloud data centers, etc., storing and managing information describing network broadcast schedules, content descriptions (e.g., genres, show names, etc.), etc. For example, the media source data database 110 can store media source data corresponding to the panelist data stored in the panel data database 105. In some examples, the media source data database 110 stores a broadcast schedule identifying a time of day when a television show, advertisement, etc. aired, what channel the media content aired on, etc.

The reference data database 112 may correspond to one or more databases, servers, cloud data centers, etc., storing and managing media exposure data generated by a third-party source. For example, third-party data can include monitoring data collected by a separate entity than the AME. For example, the third-party data can include monitoring data from subscription video on demand services (SVOD) (e.g., Netflix®, Hulu®, etc.). In some examples, third-party data does not have the same level of granularity as the panel data stored in the panel data database 105. That is, the third-party data stored in the reference data database 112 does not include viewer demographic labels, etc. Thus, the third-party data is often partially labeled, unlabeled, anonymized, etc. The census data database 115 may correspond to one or more databases, servers, cloud data centers, etc., storing and managing panelist media exposure data obtained by one or more media distributors (e.g., such as exposure data obtained from return path data). For example, the data stored in the census data database 115 can be collected from one or more devices (e.g., set-top-boxes (STBs)) used to obtain media from a media distributor. In some examples, the data stored in the census data database 115 includes data from a relatively larger sample size compared to the panelist data stored in the panel data database 105.

The example variational inference audience measurement system 100 also includes an example training data retriever 120, an example inference neural network 125 and an example training controller 130. In the illustrated example, the inference neural network 125 is structured to output model parameters of a probabilistic model that is to represent audience rating probabilities based on a set of characteristics of the input data. For example, the characteristics of the input data could include broadcast channel, program name, program genre, time of day, audience demographic data (e.g., gender, age, income, ethnicity, race etc.), etc. In some examples, the model parameters output from the inference neural network 125 are a set of function parameters of a particular probability function (e.g., such as the α, β parameters of the Beta distribution described above). In some examples, the model parameters output from the inference neural network 125 are set of non-parametric probability values corresponding to different combinations/ranges of characteristics of the input data. For example, the inference neural network 125 estimates a probability function based on the input data. That is, the inference neural network 125 generates function parameters based on the input data. For example, the inference neural network 125 may generate function parameters based on Equation 3. That is, the function parameters depend on the features used in the inference neural network 125 (e.g., broadcast channel, program name, audience demographic data, etc.). However, in other examples, the inference neural network 125 could be structured to output model parameters of a probabilistic model that is to represent any other type(s) and/or number(s) of measurements based on characteristics of the input data.

In the illustrated example of FIG. 1, the training data retriever 120 retrieves panel data from the panel data database 105, media source data from the media source data database 110, and third party data from the reference data database 112 via an example network 135. The training data retriever 120 applies the retrieved panel data, media source data, and third-party data as training data to the inference neural network 125. The training of the inference neural network 125 is controlled by the training controller 130, which trains the inference neural network 125 using any appropriate training criteria, procedures, etc. For example, the training controller 130 may train the inference neural network 125 to select a model using Kullback-Leibler (KL) divergence. In some examples, the training controller 130 can minimize KL divergence by maximizing Evidence Lower Bound (ELBO).

In some examples, the training controller 130 may determine whether the training data accessed by the training data retriever 120 is partially labeled data and/or unlabeled (e.g., sparse datasets, weakly-labeled datasets, etc.). For example, the training controller 130 may determine the panel data from the panel data database 105 is labeled. The training controller 130 may also determine the third-party data from the reference data database 112 is unlabeled and/or partially labeled. For example, the training controller 130 may determine the third-party data does not indicate whether the television associated with television tuning data is on, the time of day during which media data was presented, etc. In some examples, the training controller 130 trains the inference neural network 125 using a variational autoencoder in response to the training data being labeled. In some examples, the training controller 130 trains the inference neural network 125 using a semi-supervised autoencoder in response to the training data being unlabeled and/or partially labeled.

After training is complete, the resulting set of probabilistic model parameters output by the inference neural network 125 represent a multivariate probability distribution that models a desired measurement (e.g., audience rating) for multidimensional input data corresponding to the different characteristics of the input data used to train the neural network (e.g., such as broadcast channel, program name, program genre, time of day, audience demographic data (e.g., gender, age, income, etc.), etc., in the above example).

In the illustrated example of FIG. 1, the model parameters output from the inference neural network 125 are used to generate ratings metrics from the census data that can be obtained from the census data database 115. As such, the variational inference audience measurement system 100 of the illustrated example further includes an example census data retriever 140, and example model evaluator 145 and an example ratings metric generator 150. The census data retriever 140 retrieves census data from the census data database 115 via an example network 155, which maybe the same as, or different from, the network 135. The census data retriever 140 applies the retrieved census data to the model evaluator 145, which evaluates the probability model for the retrieved census data using the model parameters output from the inference neural network 125. For example, the model evaluator 145 may apply the census data to the trained model to generate tailored values of the model parameters. That is, the trained model is updated based on the census data. In some examples, the census data includes at least a time of day and a media source (e.g., network). The census data can further include weather data, demographic data (e.g., age, gender, income, race, etc.). In some examples, the census data can include partially labeled and/or unlabeled data. Thus, the model evaluator 145 can determine to update the trained model based on the census data.

In the case of partially labeled census data in which one or more of the characteristics of the training data set are missing, the model evaluator 145 integrates (e.g., numerically) the probability model over the domain(s) of the missing characteristic(s) to yield a marginal probability model that outputs probabilities for just the characteristic dimensions represented in the census data. Thus, in some examples, the model evaluator 145 outputs a reduced-dimensionality probability model based on the model parameters output from the inference neural network 125, with the dimension reduced to correspond to the characteristics available in the retrieved census data. For example, if one or more demographic categories are not available in the census data but were available in the training data, the model evaluator 145 may integrate the original probability model, with the parameters output from the inference neural network 125, over the possible ranges of the missing demographic categories to obtain a reduced-dimensionality probability model representative of the obtained census data. For example, the training data may include panel data (e.g., stored in the panel data database 105) and thus, include features such as time of day, network, and panelist demographic data such as age, gender, and race. However, the census data may include features such as time of day, network, and relatively less granular panelist demographic data (e.g., only age, only gender, only age and gender, etc.). For example, the census data includes time of day, network, and age. Thus, the model evaluator 145 generates updated model parameters based on the training data without the gender and race data originally included in training and generating the model.

In the illustrated example, the ratings metric generator 150 generates one or more ratings metrics using the evaluated probabilistic model output from the model evaluator 145. For example, the ratings metric generator 150 may numerically integrate the evaluated probabilistic model output from the model evaluator 145 over particular ranges of the characteristics available in the obtained census data to output ratings metrics corresponding to those ranges of the characteristics. For example, the ratings metric generator 150 determines ratings metrics based on census data including the time of day, the media source, and viewer demographics. In examples disclosed herein, the evaluated probabilistic model is based on the model parameters generated by the inference neural network 125 and/or the model evaluator 145. Examples of such ratings metrics could be an average audience rating for a particular program, an average audience rating for a genre of program on a particular network, a confidence interval for the audience rating for a given program on a given broadcast channel at a given time of time, etc.

In the illustrated example, the media monitoring application 160 processes the one or more ratings metrics output from the ratings metric generator 150 to perform one or more operations based on that information. For example, the media monitoring application 160 may include one or more dynamic advertisement insertion applications to utilize the one or more ratings metrics output by the ratings metric generator 150 to select companion media, targeted commercials, etc., to provide to be presented on a media presentation device. For example, the media monitoring application 160 may insert an advertisement in response to a ratings metric that exceeds a rating threshold (e.g., insert an advertisement in response to a large audience).

Figure 2:
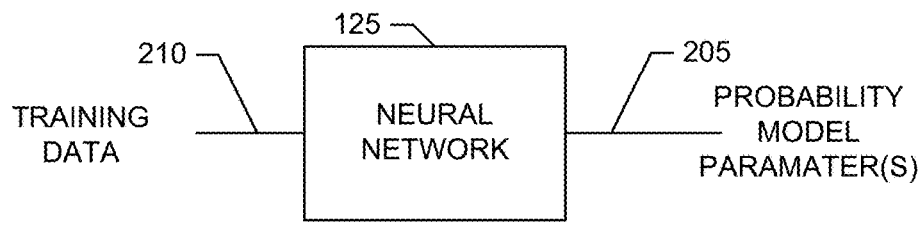
FIG. 2 illustrates a first example implementation of an example inference neural network 125 included in the example system of FIG. 1.

FIG. 2 illustrates a block diagram of a first example implementation of the inference neural network 125 of FIG. 1. In the illustrated example of FIG. 2, the inference neural network 125 is implemented as a single neural network that outputs example probability model parameters 205 for a multivariate probability model having dimensions corresponding to characteristics available in example input training data 210. For example, the inference neural network 125 receives training data (e.g., panel data from the panel data database 105, media source data from the media source data database 110, and third party data from the reference data database 112). In some examples, the inference neural network 125 generates $\alpha$, $\beta$ parameters as the probability model parameters 205 for a Binomial distribution to generate ratings. In some other examples, the inference neural network 125 generates k, $\theta$ parameters and/or $\alpha$, $\beta$ parameters as the probability model parameters 205 for a Gamma distribution to generate ratings. The inference neural network 125 can use any suitable probability distribution, such as a Bernoulli distribution, a Dirichlet distribution, a Wishart distribution, etc. In some examples, the inference neural network 125 is trained using a variational autoencoder. In some examples, the inference neural network 125 is trained using a semi-supervised variational autoencoder.

Figure 3:
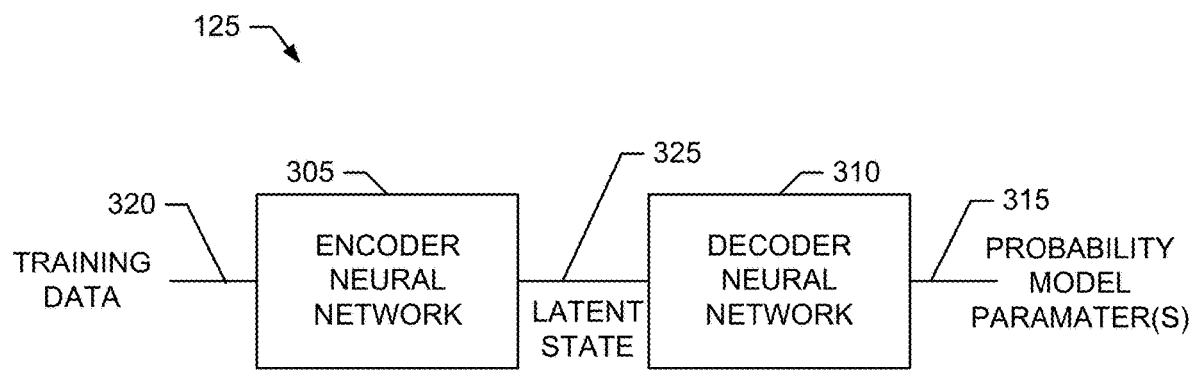
FIG. 3 illustrates a second example implementation of the example inference neural network 125 included in the example system of FIG. 1.

FIG. 3 illustrates a block diagram of a second example implementation of the inference neural network 125 of FIG. 1. In the illustrated example of FIG. 3, the inference neural network 125 is implemented as an example encoder neural network 305 in communication with an example decoder neural network 310. In the illustrated example, the decoder neural network 310 outputs example probability model parameters 315 for a multivariate probability model having dimensions corresponding to characteristics available in example input training data 320 applied to the encoder neural network 305. In the illustrated example, the encoder neural network 305 outputs an example latent state 325 of data, which has reduced dimensionality than the input training data 320. The latent state 325 is processed by the decoder neural network 310 to output the probability model parameters 315. For example, the encoder neural network 305 receives training data (e.g., panel data from the panel data database 105, media source data from the media source data database 110, and third party data from the reference data database 112). In some examples, the decoder neural network 310 generates $\alpha$, $\beta$ parameters as the probability model parameters 315 for a Binomial distribution to generate ratings. In some other examples, the decoder neural network 310 generates k, $\theta$ parameters and/or $\alpha$, $\beta$ parameters as the probability model parameters 315 for a Gamma distribution to generate ratings. The inference neural network 125 can use any suitable probability distribution, such as a Bernoulli distribution, a Dirichlet distribution, a Wishart distribution, etc. In some examples, the inference neural network 125 uses lossless encoding (e.g., no information of the training data 320 is lost when reducing the number of dimensions). Additionally or alternatively, the inference neural network 125 uses lossy encoding (e.g., some information of the training data 320 is lost when reducing the number of dimensions and is not recovered by the decoder neural network 310). In some examples, the encoder neural network 305 and the decoder neural network 310 are trained together using a variational autoencoder. In some examples, the encoder neural network 305 and the decoder neural network 310 are trained together using a semi-supervised variational autoencoder.

In some examples, the encoder neural network 305 and the decoder neural network 310 (e.g., the inference neural network 125) can be decomposed into two subunits, a model and a guide. For example, the guide contains the encoder neural network 305 and the decoder neural network 310. In some other examples, the model contains the encoder neural network 305 while the guide contains the decoder neural network 310. The model of the encoder neural network 305 includes two components, p(z) and p(x|z). In examples disclosed herein, p(z) is the prior probability placed on the unknown variables of interest (e.g., the audience rating) and p(x|z) is a probabilistic model of the likelihood of the observed data x (e.g., the panel data from the panel data database 105, the media source data from the media source data database 110, and/or the third party data from the reference data database 112) given the unknown variables of interest. For example, p(z) may be sampled using a Beta distribution and p(x|z) may be estimated using a Bernoulli distribution. In some examples, the parameter(s) of p(x|z) are estimated by the decoder neural network 310. In some examples, the encoder neural network 305 estimates a guide function q(z|x). That is, q(z|x) is a function designed to approximate the dependency of the variables of interest, z, on the observed data x. For example, the encoder neural network 305 may estimate $\alpha$, $\beta$ parameters based on one or more characteristics of the observed data (e.g., time of day, network, age, gender, weather, etc.) to be used in a probability distribution (e.g., a Beta distribution). That is, the $\alpha$, $\beta$ parameters can be used in the Beta distribution to estimate the variable of interest, z (e.g., the audience rating). Thus, the guide can estimate the audience ratings based on the Beta distribution using $\alpha$, $\beta$ estimates. In other words, the guide contains a neural network (e.g., the encoder neural network 305 and the decoder neural network 310) to transform observed data x into ratings probabilities given the observed data x, q(z|x). Thus, the true audience ratings (e.g., p(z|x)) can be estimated by q(z|x).

While an example manner of implementing the variational inference audience measurement system 100 is illustrated in FIGS. 1-3, one or more of the elements, processes and/or devices illustrated in FIGS. 1-3 may be combined, divided, re-arranged, omitted, eliminated and/or implemented in any other way. Further, the example databases 105, 110, 112 and/or 115, the example training data retriever 120, the example inference neural network 125, the example training controller 130, the example network 135, the example census data retriever 140, the example model evaluator 145, the example ratings metric generator 150, the example network 155, the example media monitoring application 160 and/or, more generally, the example variational inference audience measurement system 100 of FIGS. 1-3 may be implemented by hardware, software, firmware and/or any combination of hardware, software and/or firmware. Thus, for example, any of the example databases 105, 110, 112 and/or 115, the example training data retriever 120, the example inference neural network 125, the example training controller 130, the example network 135, the example census data retriever 140, the example model evaluator 145, the example ratings metric generator 150, the example network 155, the example media monitoring application 160 and/or, more generally, the example variational inference audience measurement system 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). When reading any of the apparatus or system claims of this patent to cover a purely software and/or firmware implementation, at least one of the example variational inference audience measurement system 100, the example databases 105, 110, 112 and/or 115, the example training data retriever 120, the example inference neural network 125, the example training controller 130, the example network 135, the example census data retriever 140, the example model evaluator 145, the example ratings metric generator 150, the example network 155, and/or the example media monitoring application 160 is/are hereby expressly defined to include a non-transitory computer readable storage device or storage disk such as a memory, a digital versatile disk (DVD), a compact disk (CD), a Blu-ray disk, etc. including the software and/or firmware. Further still, the example variational inference audience measurement system 100 may include one or more elements, processes and/or devices in addition to, or instead of, those illustrated in FIGS. 1-3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
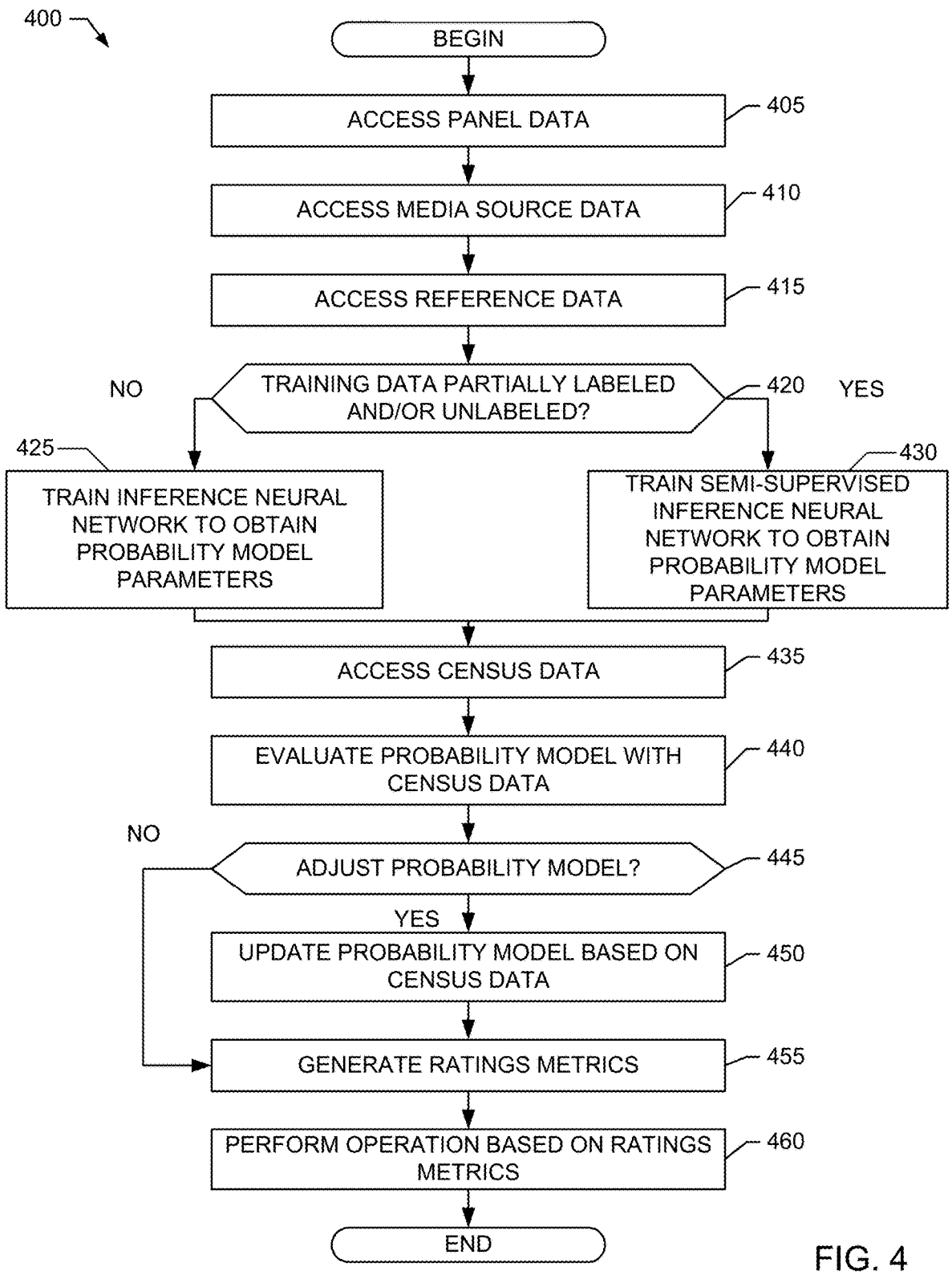
FIG. 4 illustrated a flowchart representative of example machine readable instructions that may be executed to implement the example system of FIG. 1.

A flowcharts representative of example hardware logic, machine readable instructions, hardware implemented state machines, and/or any combination thereof for implementing the example variational inference audience measurement system 100 is shown in FIG. 4. In these examples, the machine readable instructions may be one or more executable programs or portion(s) of an executable program for execution by a computer processor, such as the processor 512 shown in the example processor platform 500 discussed below in connection with FIG. 5. The one or more programs, or portion(s) thereof, may be embodied in software stored on a non-transitory computer readable storage medium such as a CD-ROM, a floppy disk, a hard drive, a DVD, a Blu-ray Disk™, or a memory associated with the processor 512, but the entire program or programs and/or parts thereof could alternatively be executed by a device other than the processor 512 and/or embodied in firmware or dedicated hardware. Further, although the example program(s) is(are) described with reference to the flowchart illustrated in FIG. 4, many other methods of implementing the example variational inference audience measurement system 100 may alternatively be used. For example, with reference to the flowchart illustrated in FIG. 4, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example process of FIG. 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 4 illustrates an example program 400 that may be executed to implement the variational inference audience measurement system 100 of FIGS. 1-3. With reference to the preceding figures and associated written descriptions, the example program 400 of FIG. 4 begins execution at block 405 at which the example training data retriever 120 retrieves panel data from the example panel data database 105, as described above. At block 410, the training data retriever 120 retrieves example media source data from the example media source data database 110, as described above. At block 415, the training data retriever 120 retrieves example third-party data from the example reference data database 112, as described above.

At block 420, the example training controller 130 determines whether the training data is partially labeled and/or unlabeled. For example, the training controller 130 may determine training data including the panel data from the panel data database 105 is labeled. In some other examples, the training controller 130 may determine training data including the third-party data from the reference data database 112 is unlabeled.

If, at block 420, the training controller 130 determines the training data is not partially labeled and/or unlabeled (e.g., the training data is labeled), at block 425, the training controller 130 trains the inference neural network to obtain probability model parameters. For example, the training controller 130 may use a variational autoencoder to train the inference neural network 125 of FIGS. 2 and/or 3. If, at block 420, the training controller 130 determines the training data is partially labeled and/or unlabeled, at block 430, the training controller 130 trains a semi-supervised inference neural network to obtain probability model parameters. For example, the training controller 130 may use a semi-supervised variational autoencoder to train the inference neural network 125 of FIGS. 2 and/or 3 (e.g., semi-supervised training).

At block 435, the example census data retriever 140 retrieves example census data from the example census data database 115, as described above. At block 440, the example model evaluator 145 evaluates the probability model for the census data and with the model parameters output from the inference neural network 125, as described above. For example, the model evaluator 145 may determine whether the census data is labeled, whether the census data includes the same labels as the training data, etc.

At block 445, the model evaluator 145 determines whether to adjust the probability model. For example, the model evaluator 145 may determine to adjust the probability model in response to the census data and the training data not including the same characteristics. If, at block 445, the model evaluator 145 determines to adjust the probability model, at block 450, the model evaluator 145 updates the probability model based on the census data. For example, the model evaluator 145 integrates over the probability model over the domain(s) of the missing characteristic(s) to yield a marginal probability model that outputs probabilities for just the characteristic dimensions represented in the census data.

If, at block 445, the model evaluator 145 determines to not adjust the probability model, at block 455, the example ratings metric generator 150 generates one or more ratings metrics. For example, the ratings metric generator 150 may use the evaluated probabilistic model output from the model evaluator 145 to generate audience ratings. At block 460, the media monitoring application 160 performs operation(s) based on ratings metrics generated by the ratings metric generator 150. For example, the media monitoring application 160 may display an advertisement in response to the ratings metric satisfying a ratings threshold.

Figure 5:
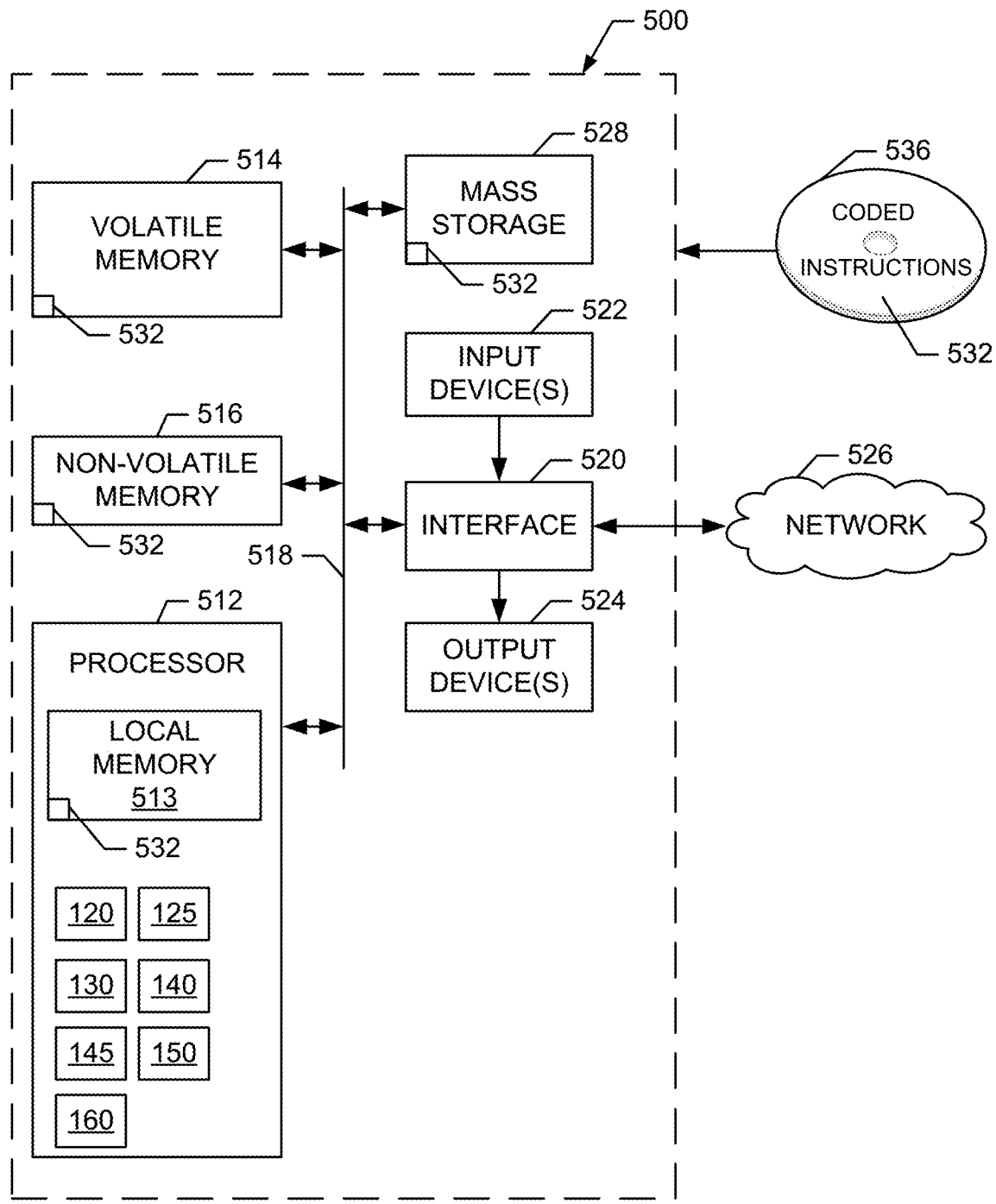
FIG. 5 is a block diagram of an example processor platform structured to execute the example machine readable instructions of FIG. 4 to implement the example system of FIG. 1.

FIG. 5 is a block diagram of an example processor platform 500 structured to execute the instructions of FIG. 4 to implement the example variational inference audience measurement system 100 of FIGS. 1-3. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor 512 may be a semiconductor based (e.g., silicon based) device.

The processor 512 of the illustrated example includes a local memory 513 (e.g., a cache). The processor 512 of the illustrated example is in communication with a main memory including a volatile memory 514 and a non-volatile memory 516 via a link 518. The link 518 may be implemented by a bus, one or more point-to-point connections, etc., or a combination thereof. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 500, can allow the user to control the computer system and provide data to the computer using physical gestures, such as, but not limited to, hand or body movements, facial expressions, and face recognition.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 corresponding to the instructions of FIG. 4 may be stored in the mass storage device 528, in the volatile memory 514, in the non-volatile memory 516, in the local memory 513 and/or on a removable non-transitory computer readable storage medium, such as a CD or DVD 536.

From the foregoing, it will be appreciated that example methods, apparatus, and articles of manufacture have been disclosed that allow for probabilistic modeling for anonymized data integration and Bayesian survey measurement of sparse and weakly-labeled datasets. The disclosed methods, apparatus, and articles of manufacture improve the efficiency of using a computing device by reducing computation and storage requirements of systems that generate audience ratings. The disclosed examples prevent unneeded storage and generation of stratified audience samples by estimating audience ratings using probabilistic models. In some examples, the disclosed examples allow for audience rating generation using partially labeled and/or unlabeled data. The disclosed methods, apparatus, and articles of manufacture are accordingly directed to one or more improvement(s) in the functioning of a computer.

Example methods, apparatus, systems, and articles of manufacture to perform probabilistic modeling for anonymized data integration and Bayesian survey measurement of sparse and weakly-labeled datasets are disclosed herein. Further examples and combinations thereof include the following:

Example 1 includes an apparatus comprising a training controller to train a neural network based on training data to produce a trained neural network that is to output model parameters of a probability model, the training data including media source data and panel data obtained from meters monitoring media devices associated with a plurality of panelists, a model evaluator to execute the trained neural network on input data specifying a time of day, a media source, and at least one feature different from the time of day and the media source to determine one or more first model parameters of the probability model, and a ratings metric generator to evaluate the probability model based on input census data to determine a ratings metric corresponding to the time of day, the media source, and the at least one feature, the probability model configured with the one or more first model parameters output from the trained neural network.

Example 2 includes the apparatus of example 1, wherein the at least one feature includes at least one of age, gender, race, ethnicity, or weather.

Example 3 includes the apparatus of example 1, wherein the neural network is a first neural network, and wherein the training controller is to perform semi-supervised training of a second neural network based on a second set of training data to produce a second trained neural network that is to output model parameters of a second probability model, the second set of training data including at least one of unlabeled data or partially labeled data.

Example 4 includes the apparatus of example 3, wherein the second probability model has relatively fewer dimensions than the first probability model.

Example 5 includes the apparatus of example 1, wherein the training controller is to train the neural network at least in part with a variational autoencoder, the variational autoencoder including an encoder and a decoder.

Example 6 includes the apparatus of example 5, wherein the training controller is to incorporate the at least one feature and a second feature in a guide function of the encoder to train the neural network.

Example 7 includes the apparatus of example 6, wherein the guide function is to sample a Beta distribution.

Example 8 includes the apparatus of example 1, wherein the census data includes partially labeled census data, and the model evaluator is to evaluate the probability model based on the partially labeled census data and the first model parameters output from the trained neural network to generate a reduced-dimensionality probability model.

Example 9 includes the apparatus of example 8, wherein the training data includes a plurality of features, and the partially labeled census data includes a subset of the plurality of features.

Example 10 includes the apparatus of example 9, wherein the subset of the plurality of features is missing a feature from the plurality of features, and the model evaluator is to configure the probability model with the first model parameters, and integrate the probability model over a domain of the missing feature to generate the reduced-dimensionality probability model.

Example 11 includes the apparatus of example 1, further including a media monitoring application to perform an operation based on the ratings metric, the operation to include inserting an advertisement in response to the ratings metric satisfying a ratings threshold.

Example 12 includes a method comprising training a neural network based on training data to produce a trained neural network that is to output model parameters of a probability model, the training data including media source data and panel data obtained from meters monitoring media devices associated with a plurality of panelists, executing the trained neural network on input data specifying a time of day, a media source, and at least one feature different from the time of day and the media source to determine one or more first model parameters of the probability model, and evaluating, by executing an instruction with a processor, the probability model based on input census data to determine a ratings metric corresponding to the time of day, the media source, and the at least one feature, the probability model configured with the one or more first model parameters output from the trained neural network.

Example 13 includes the method of example 12, wherein the at least one feature includes at least one of age, gender, race, ethnicity, or weather.

Example 14 includes the method of example 12, wherein the neural network is a first neural network, and further including performing semi-supervised training of a second neural network based on a second set of training data to produce a second trained neural network that is to output model parameters of a second probability model, the second set of training data including at least one of unlabeled data or partially labeled data.

Example 15 includes the method of example 14, wherein the second probability model has relatively fewer dimensions than the first probability model.

Example 16 includes the method of example 12, wherein the training is performed at least in part with a variational autoencoder, the variational autoencoder including an encoder and a decoder.

Example 17 includes the method of example 16, further including incorporating the at least one feature and a second feature in a guide function of the encoder to train the neural network.

Example 18 includes the method of example 17, wherein the guide function is to sample a Beta distribution.

Example 19 includes the method of example 12, wherein the census data includes partially labeled census data, and further including evaluating the probability model based on the partially labeled census data and the first model parameters output from the trained neural network to generate a reduced-dimensionality model.

Example 20 includes the method of example 19, wherein the training data includes a plurality of features, and the partially labeled census data includes a subset of the plurality of features.

Example 21 includes the method of example 20, wherein the subset of the plurality of features is missing a feature from the plurality of features, and further including configuring the probability model with the first model parameters, and integrating the probability model, over a domain of the missing feature to generate the reduced-dimensionality probability model.

Example 22 includes the method of example 12, further including performing an operation based on the ratings metric, the operation to include inserting an advertisement in response to the ratings metric satisfying a ratings threshold.

Example 23 includes a non-transitory computer readable medium comprising instructions which, when executed, cause a machine to at least train a neural network based on training data to produce a trained neural network that is to output model parameters of a probability model, the training data including media source data and panel data obtained from meters monitoring media devices associated with a plurality of panelists, execute the trained neural network on input data specifying a time of day, a media source, and at least one feature different from the time of day and the media source to determine one or more first model parameters of the probability model, and evaluate the probability model based on input census data to determine a ratings metric corresponding to the time of day, the media source, and the at least one feature, the probability model configured with the one or more first model parameters output from the trained neural network.

Example 24 includes the non-transitory computer readable medium of example 23, wherein the at least one feature includes at least one of age, gender, race, ethnicity, or weather.

Example 25 includes the non-transitory computer readable medium of example 23, wherein the neural network is a first neural network, and wherein the instructions cause the machine further to perform semi-supervised training of a second neural network based on a second set of training data to produce a second trained neural network that is to output model parameters of a second probability model, the second set of training data including at least one of unlabeled data or partially labeled data.

Example 26 includes the non-transitory computer readable medium of example 25, wherein the second probability model has relatively fewer dimensions than the first probability model.

Example 27 includes the non-transitory computer readable medium of example 23, wherein the instructions cause the machine further to train the neural network at least in part with a variational autoencoder, the variational autoencoder including an encoder and a decoder.

Example 28 includes the non-transitory computer readable medium of example 27, wherein the instructions cause the machine further to incorporate the at least one feature and a second feature in a guide function of the encoder to train the neural network.

Example 29 includes the non-transitory computer readable medium of example 28, wherein the guide function is to sample a Beta distribution.

Example 30 includes the non-transitory computer readable medium of example 23, wherein the census data includes partially labeled census data, and wherein the instructions cause the machine further to evaluate the probability model based on the partially labeled census data and the first model parameters output from the trained neural network to generate a reduced-dimensionality probability model.

Example 31 includes the non-transitory computer readable medium of example 30, wherein the training data includes a plurality of features, and the partially labeled census data includes a subset of the plurality of features.

Example 32 includes the non-transitory computer readable medium of example 31, wherein the subset of the plurality of features is missing a feature from the plurality of features, and wherein the instructions cause the machine further to configure the probability model with the first model parameters, and integrate the probability model over a domain of the missing feature to generate the reduced-dimensionality probability model.

Example 33 includes the non-transitory computer readable medium of example 23, wherein the instructions cause the machine further to perform an operation based on the ratings metric, the operation to include inserting an advertisement in response to the ratings metric satisfying a ratings threshold.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An audience measurement computing system comprising:
    a network interface;
    a processor;
    at least one memory storing computer-readable instructions that, when executed by the processor, cause the audience measurement computing system to perform operations comprising:
        accessing first input data via the network interface and from meters, the meters configured to monitor media devices associated with a plurality of panelists of an audience measurement entity, the first input data including media source data and panel data;
        training a first neural network based on training data to produce a first trained neural network configured to reduce a dimensionality of the first input data to generate second input data of reduced dimensionality relative to the first input data, wherein the dimensionality of the first input data is reduced based on (1) a prior probability of an audience rating associated with the plurality of panelists and (2) an approximation of a dependency of the audience rating on at least one of the media source data and the panel data;
        executing the first trained neural network to reduce the dimensionality of the first input data to generate the second input data;
        executing a second neural network, different from the first trained neural network, to decode the second input data of reduced dimensionality to output a probability model parameter for a multivariate probability model, the multivariate probability model having dimensions corresponding to the first input data;
        configuring the multivariate probability model with the probability model parameter;
        evaluating the multivariate probability model based on census data to determine whether the census data and the first input data include the same features; and
        based on a determination that the census data does not include a feature that the first input data includes, updating the multivariate probability model by integrating the multivariate probability model over a domain of the feature.

2. The audience measurement computing system of claim 1, the operations further comprising:
    performing a lossless encoding to reduce information loss associated with generation of the second input data of reduced dimensionality.

3. The audience measurement computing system of claim 1, wherein the audience rating includes a percentage of the plurality of panelists that was exposed to an advertisement.

4. The audience measurement computing system of claim 1, wherein the census data includes partially labeled data associated with a media exposure, the partially labeled data to identify at least one of a time of day associated with the media exposure, weather data associated with the media exposure, or demographic data associated with the media exposure.

5. The audience measurement computing system of claim 4, wherein evaluating the multivariate probability model based on the census data comprises evaluating the multivariate probability model based on the partially labeled data.

6. The audience measurement computing system of claim 1, the operations further comprising:
    using the updated multivariate probability model to generate one or more audience ratings metrics; and
    based on a determination that the one or more audience ratings metrics satisfy a ratings threshold:
        selecting an advertisement, and
        causing a media monitoring application to display the selected advertisement on a media presentation device.

7. The audience measurement computing system of claim 1, wherein the updated multivariate probability model is configured to label the census data.

8. A non-transitory computer readable medium comprising computer-readable instructions that, when executed, cause a processor to perform operations comprising:
    accessing first input data via a network interface and from meters, the meters configured to monitor media devices associated with a plurality of panelists of an audience measurement entity, the first input data including media source data and panel data;
    training a first neural network based on training data to produce a first trained neural network configured to reduce a dimensionality of the first input data to generate second input data of reduced dimensionality relative to the first input data, wherein the dimensionality of the first input data is reduced based on (1) a prior probability of an audience rating associated with the plurality of panelists and (2) an approximation of a dependency of the audience rating on at least one of the media source data and the panel data;
    executing the first trained neural network to reduce the dimensionality of the first input data to generate the second input data;

executing a second neural network, different from the first trained neural network, to decode the second input data of reduced dimensionality to output a probability model parameter for a multivariate probability model, the multivariate probability model having dimensions corresponding to the first input data;

configuring the multivariate probability model with the probability model parameter;

evaluating the multivariate probability model based on census data to determine whether the census data and the first input data include the same features; and based on a determination that the census data does not include a feature that the first input data includes, updating the multivariate probability model by integrating the multivariate probability model over a domain of the feature.

9. The non-transitory computer readable medium of claim 8, the operating further comprising:

performing a lossless encoding to reduce information loss associated with generation of the second input data of reduced dimensionality.

10. The non-transitory computer readable medium of claim 8, wherein the audience rating includes a percentage of the plurality of panelists that was exposed to an advertisement.

11. The non-transitory computer readable medium of claim 8, wherein the census data includes partially labeled data associated with a media exposure, the partially labeled data to identify at least one of a time of day associated with the media exposure, weather data associated with the media exposure, or demographic data associated with the media exposure.

12. The non-transitory computer readable medium of claim 11, wherein evaluating the multivariate probability model based on the census data comprises evaluating the multivariate probability model based on the partially labeled data.

13. The non-transitory computer readable medium of claim 8, the operations further comprising:

using the updated multivariate probability model to generate one or more audience ratings metrics; and based on a determination that the one or more audience ratings metrics satisfy a ratings threshold:
  selecting an advertisement, and
  causing a media monitoring application to display the selected advertisement on a media presentation device.

14. The non-transitory computer readable medium of claim 8, wherein the updated multivariate probability model is configured to label the census data.

15. A method performed by a computing system comprising a processor, the method comprising:

accessing first input data via a network interface and from meters, the meters configured to monitor media devices associated with a plurality of panelists of an audience measurement entity, the first input data including media source data and panel data;

training a first neural network based on training data to produce a first trained neural network configured to reduce a dimensionality of the first input data to generate second input data of reduced dimensionality relative to the first input data, wherein the dimensionality of the first input data is reduced based on (1) a prior probability of an audience rating associated with the plurality of panelists and (2) an approximation of a dependency of the audience rating on at least one of the media source data and the panel data;

executing the first trained neural network to reduce the dimensionality of the first input data to generate the second input data;

executing a second neural network, different from the first trained neural network, to decode the second input data of reduced dimensionality to output a probability model parameter for a multivariate probability model, the multivariate probability model having dimensions corresponding to the first input data;

configuring the multivariate probability model with the probability model parameter;

evaluating the multivariate probability model based on census data to determine whether the census data and the first input data include the same features, and based on a determination that the census data does not include a feature that the first input data includes, updating the multivariate probability model by integrating the multivariate probability model over a domain of the feature.

16. The method of claim 15, further comprising:

performing a lossless encoding to reduce information loss associated with generation of the second input data of reduced dimensionality.

17. The method of claim 15, wherein the audience rating includes a percentage of the plurality of panelists that was exposed to an advertisement.

18. The method of claim 15, wherein the census data includes partially labeled data associated with a media exposure, the partially labeled data to identify at least one of a time of day associated with the media exposure, weather data associated with the media exposure, or demographic data associated with the media exposure.

19. The method of claim 15, further comprising:

using the updated multivariate probability model to generate one or more audience ratings metrics; and based on a determination that the one or more audience ratings metrics satisfy a ratings threshold:
  selecting an advertisement, and
  causing a media monitoring application to display the selected advertisement on a media presentation device.

20. The method of claim 15, wherein the updated multivariate probability model is configured to label the census data.

* * * * *